United States Patent [19]

Daspit

[11] 4,441,053

[45] Apr. 3, 1984

[54] SWITCHED MODE ELECTRODE BALLAST

[75] Inventor: John I. Daspit, Santa Monica, Calif.

[73] Assignee: Data-Design Laboratories, Cucamonga, Calif.

[21] Appl. No.: 325,306

[22] Filed: Nov. 27, 1981

[51] Int. Cl.³ ............................................. H05B 37/00
[52] U.S. Cl. .................................... 315/206; 315/207; 315/208; 315/226; 315/244; 315/307; 315/DIG. 7
[58] Field of Search ......... 315/206, 208, 226, DIG. 7, 315/207, 244, 307

[56] References Cited

U.S. PATENT DOCUMENTS

| | | | |
|---|---|---|---|
| 3,753,071 | 8/1973 | Engel et al. | 315/DIG. 7 |
| 3,889,152 | 6/1975 | Bodine et al. | 315/206 |
| 4,251,752 | 2/1981 | Stolz | 315/206 |

Primary Examiner—Harold Dixon

Attorney, Agent, or Firm—Harris, Kern, Wallen & Tinsley

[57] ABSTRACT

An electronic ballast circuit for operating high intensity gas discharge tubes such as high pressure sodium, high pressure mercury and metal halide tubes, as well as ordinary fluorescent tubes. In the preferred embodiment, an inductance and a capacitance are connected in series with the load across the dc supply, with a solid state switch between the junction of the inductance and capacitance and the other side of the load, and a control circuit for the switch to operate the switch at a high frequency such as 20,000 hertz. Alternative embodiments omitting the capacitance and utilizing a transformer for the inductance are especially suited for less expensive units and for emergency lighting use. Power supply circuits with switching operated in conjunction with the previously mentioned switch provide for regulation of lamp output during start-up and for compensating changes in supply voltage coordinated with lamp aging.

27 Claims, 10 Drawing Figures

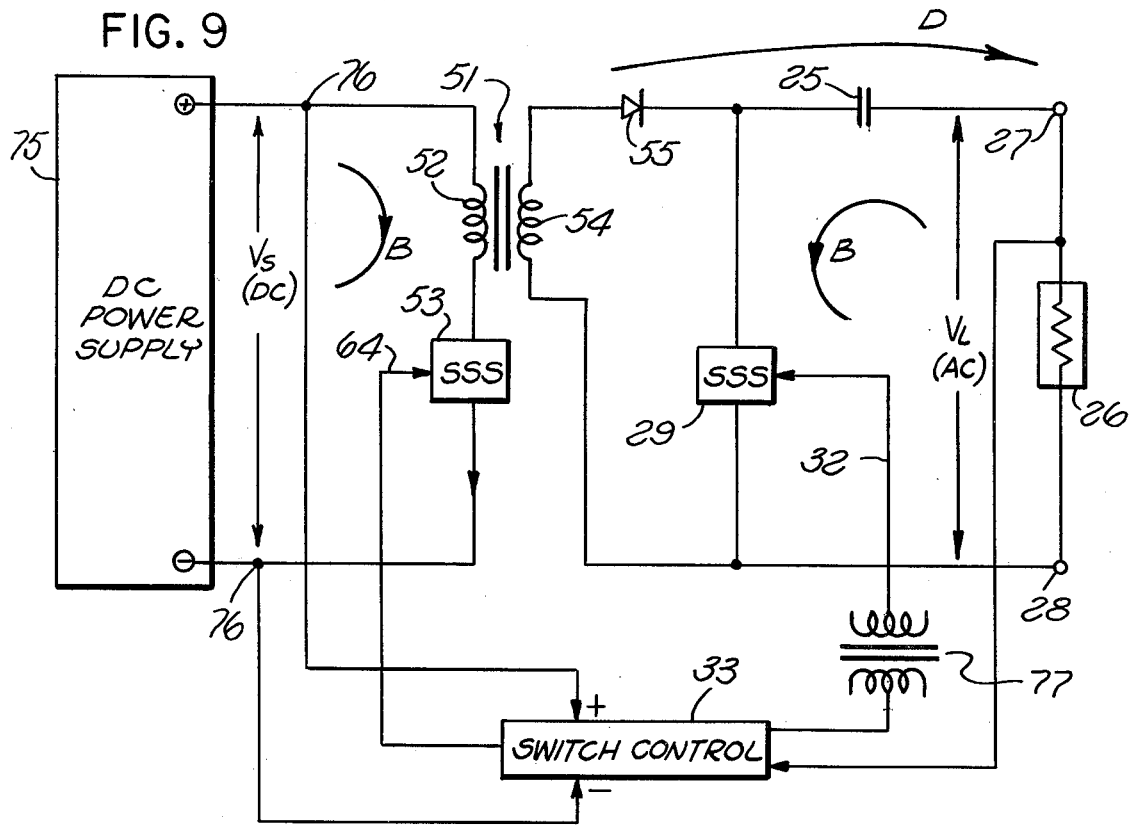
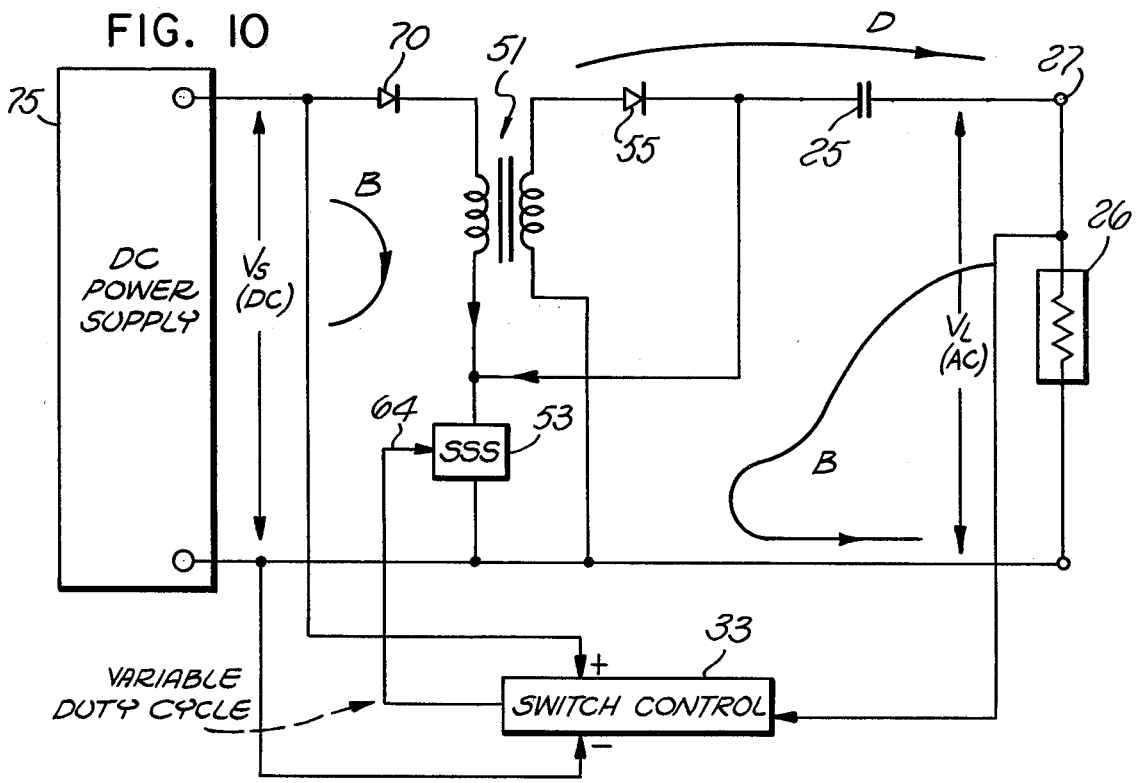

SWITCHED MODE ELECTRODE BALLAST

BACKGROUND OF THE INVENTION

This invention relates to circuits especially adapted for operating gaseous discharge lamps and in particular, to circuits of the electronic ballast type. A wide range of such circuits has been considered in the past. While the basic high frequency oscillator electronic ballast circuit is well known, a variety of problems have been encountered, including cost, efficiency, power factor, power consumption, lamp output control with power supply variation and lamp aging and start-up, and protection against open circuits and lamp burn-out, and provision for dimming of lamp output.

It is an object of the present invention to provide a new and improved electronic ballast circuit, sometimes referred to as a switched mode electronic ballast. A particular object is to provide such a circuit which inherently generates starting pulses for the gaseous discharge tubes, and one which can be utilized to start and operate a single high intensity discharge or fluorescent tube or a plurality of tubes, and when utilized with a plurality of tubes, independent starting may be obtained for each tube.

It is another object to provide a circuit which is suitable for use with continuous and/or emergency lighting applications, and in particular a circuit which may be used for uninterrupted lighting applications.

It is an object to provide an electronic ballast circuit which operates at high frequency, typically 20,000 hertz, though the switching frequency is not critical, with the circuit providing for dimming of lamp output and eliminating lamp flicker.

It is an object to provide an electronic ballast circuit in which the operation is regulated by feedback circuitry to maintain the lamp output constant while supply voltage changes and while the lamp ages. A further object is to provide such a circuit which provides protection for the circuit components during lamp start-up, lamp burn-out and operation in the absence of a lamp or other load.

It is an object also to provide a power supply high frequency switched mode filter to enable unity power factor loading of the 60 hertz line and full wave rectifier and to vastly reduce the peak current required to be supplied by the 60 hertz full wave rectifier compared to that which would be required by a conventional capacitor-input 120 hertz ripple filter. This switched mode filter can, in a typical situation, be operated synchronously with the switched mode electronic ballast (tube driver) referred to above.

Other objects, advantages, features and results will more fully appear in the course of the following description.

SUMMARY OF THE INVENTION

The preferred embodiment of the invention is a switched mode electronic ballast circuit for operating gaseous discharge lamps including an inductance and capacitance connected in series between the dc supply and the load, and a solid state switch connecting the junction of the inductance and capacitance and the other side of the supply and load, and a control circuit for operating the switch at high frequency, with a buildup of current through the inductance when the switch is closed and a decay of the current into the load when the switch is open.

Variations on the preferred embodiment include omission of the capacitance, use of a transformer primary and secondary as the inductance, operation with a plurality of lamps as loads, and feedback control for switch operation.

The electronic ballast circuit may be operated with a battery as the dc supply or a rectified ac line as the dc supply or both. In one embodiment the dc power supply includes a rectifier having an ac input and providing a rectified dc output, a transformer coupling the rectified dc output to the inductance, switch, capacitor and load, and one or two additional switches in the transformer primary, with the duty cycle of these switches controlled for regulating the output of the overall circuit.

In one preferred embodiment, the switch control circuit includes a first oscillator with a substantially fixed frequency and duty cycle output, a second oscillator such as a monostable multivibrator which is triggered by the output from the first oscillator with its duty cycle controlled by input from an amplifier having one or more feedback inputs from voltages and currents in the circuitry, with the monostable multivibrator providing a variable duty cycle output for switch control. In circuits utilizing more than one switch, one switch may be operated at a fixed duty cycle and another with a variable duty cycle.

BRIEF DESCRIPTION OF THE DRAWINGS

FIG. 4 is an electrical diagram illustrating the use of the circuit of FIG. 3 with a plurality of loads;

FIG. 5 is an electrical diagram illustrating a dc power supply and a switch control in combination with the circuit of FIG. 1;

FIG. 9 is an electrical diagram of another alternative embodiment of the circuit of the invention utilizing the transformer primary and secondary as the inductance; and FIG. 10 is an electrical diagram of an alternative embodiment of the circuit of FIG. 9 utilizing a single switch.

DESCRIPTION OF THE PREFERRED EMBODIMENTS

Figure 1:
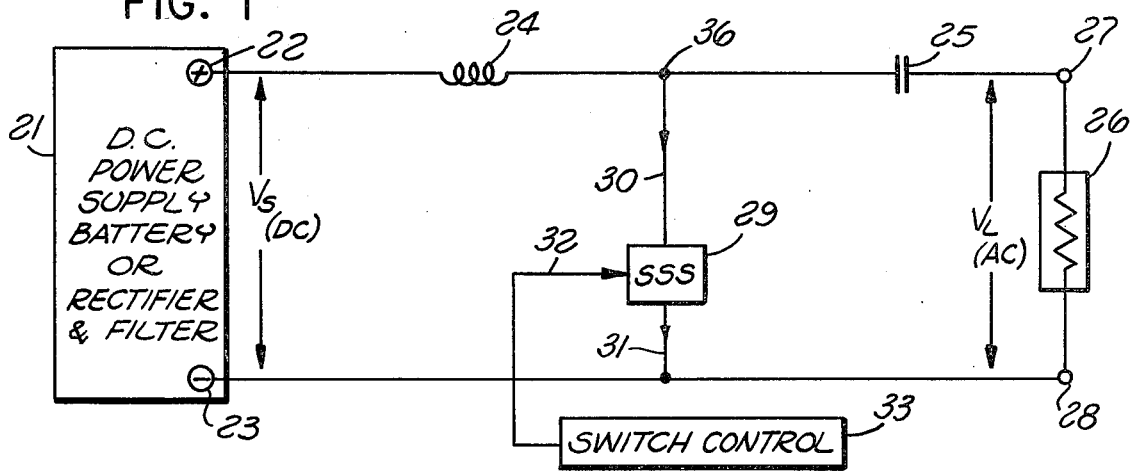
FIG. 1 is an electrical diagram of a switched mode electronic ballast circuit incorporating an embodiment of the present invention.

The electronic ballast circuit of FIG. 1 includes a dc power supply 21 with supply terminals 22, 23, an inductance 24, a capacitance 25, a load 26 connected at load terminals 27, 28, a switch 29 with input and output terminals 30, 31 and a control terminal 32, and a switch control unit 33.

The dc power supply may be a battery or an ac source with a rectifier and filter, and may be any of a variety of well known dc supplies. Some preferred embodiments for the dc supply are described herein below. The output of the dc supply at terminals 22, 23 is identified as $V_s(dc)$.

The load 26 typically is a gaseous discharge lamp or tube and may be a high intensity gas discharge tube such as a high pressure sodium or high pressure mercury or metal halide tube or may be a fluorescent tube or other gas discharge tube as desired. The load voltage across the terminal 27, 28 is identified as $V_L(ac)$.

The inductance 24 and capacitance 25 are connected in series at a junction 36, and the input and output terminals 30, 31 of the switch 29 are connected between the junction 36 and the supply and load terminals 23, 28. The switch preferably is a solid state switch, typically a transistor switch, and the switch control unit 33 provides a train of voltage pulses on the control terminal 32 for opening and closing the switch. The switch control unit provides an output at high frequency, typically 20,000 hertz and in the embodiment illustrated, preferably has a fifty percent duty cycle. That is, the switch 29 is closed or conducting for one-half the operating cycle and open or non-conducting for one-half the operating cycle.

The fifty percent duty cycle is preferred for a continuously operating lamp. The switch control unit may be a conventional multivibrator oscillator circuit such as IC 555 type.

In operation, with the switch 29 closed, there is a current build-up from dc supply 21 through the inductance 24. When the switch is open, there is a decay of this current through the capacitance 25 into the load 26. The decay current does not pass through the switch 29. During the decay or switch open interval, some of the energy stored in the inductance is transferred into the load. This cycle of energy build-up in the inductance and energy transfer to the load is repeated at the switch control frequency on the terminal 32, providing the high frequency power for energizing the lamp. With a fifty percent duty cycle, there is a bipolar symmetrical type of drive which puts equal burden on each of the two cathode emitters of the gas tube 26.

The circuit inherently generates a starting pulse of high voltage for starting the lamp. This starting pulse is self-adjusted to the starting requirements of the gaseous discharge tube. When the switch opens abruptly at the start of the decay period, a high voltage spike pulse will be generated if the gas tube is not already operating and thereby ionized. Typically the height or amplitude of the starting pulse is substantially in excess of the minimum value needed for starting the gas tube. If the tube is already in operation, the amplitude of the pulse is substantially lowered.

The output from the lamp can be varied, that is, can be dimmed by varying the switching frequency from the switch control unit 33 and/or by varying the magnitude of the dc supply at terminals 22, 23, and/or by changing the switch conduction duty factor.

The high frequency operation of the circuit yields a higher lamp efficiency. In the order of twenty to thirty percent improvement in efficiency is obtained over fluorescent tube circuits utilizing magnetic ballast. The simplicity of the circuit with a minimum of components indicates that its cost will be relatively low. Also, the operation at high frequency reduces the magnitude of the starting voltage required.

In operation, so long as the supply voltage substantially equals the load voltage, the switching frequency is not critical to maintenance of the desired fifty percent duty factor.

Figure 2:
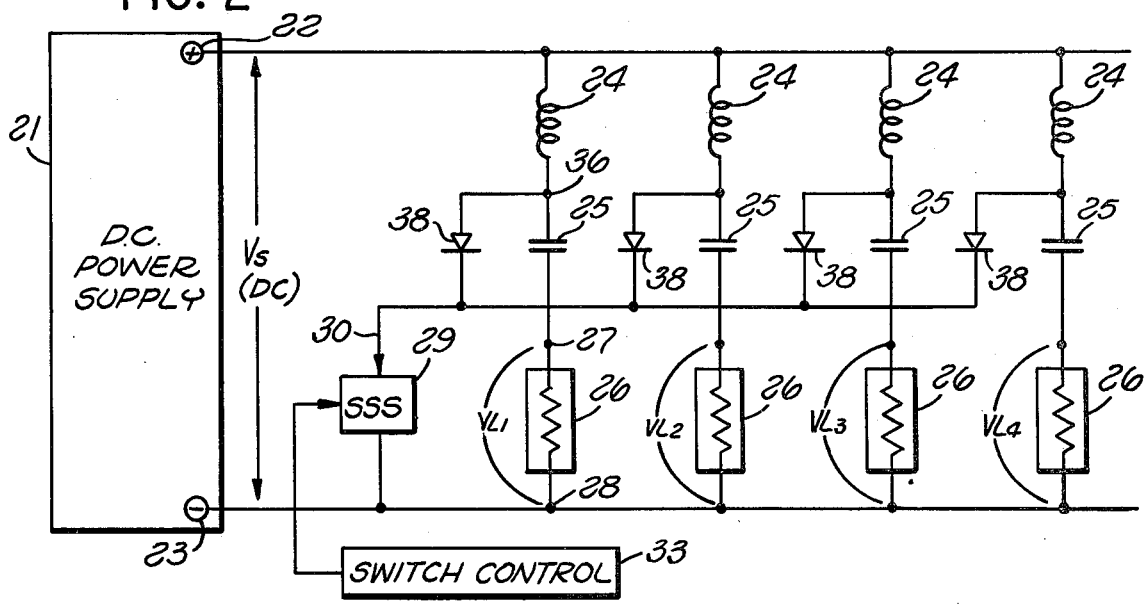
FIG. 2 is an electrical diagram illustrating the use of the circuit of FIG. 1 with a plurality of loads.
Figure 3:
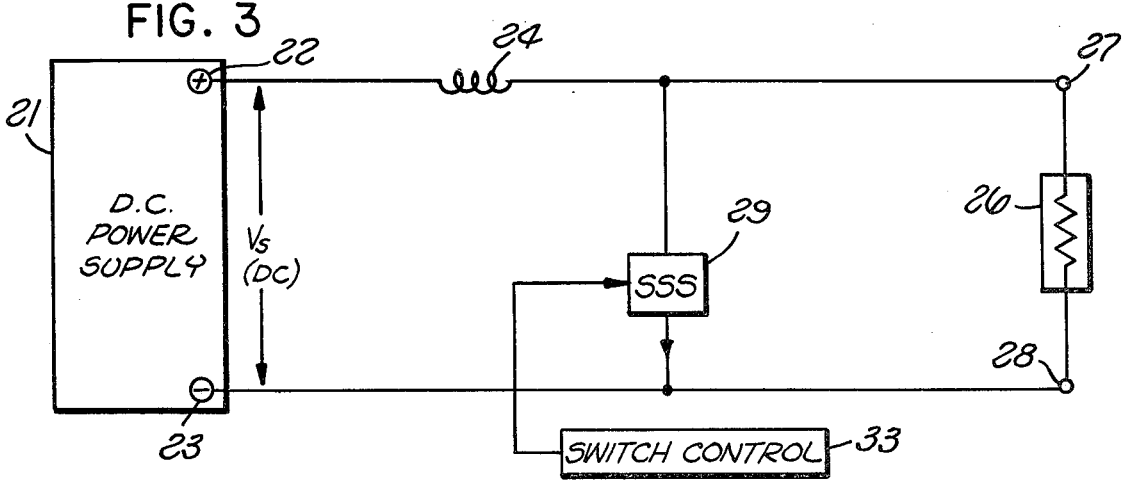
FIG. 3 is an electrical diagram similar to that of FIG. 1 showing an alternative embodiment omitting the capacitance.

The circuit of FIG. 1 may be utilized to energize a plurality of loads, and a circuit with four loads is shown in FIG. 2, where components corresponding to those of FIG. 1 are identified by the same reference numerals. In this embodiment, an isolating diode 38 is connected between the junction 36 of each inductance-capacitance pair and the terminal 30 of the switch 29. The operation is the same as described for the circuit of FIG. 1. Each of the loads is independent of the others so that there is no requirement for conventional sequence starting in pairs. An alternative embodiment of the circuit of FIG. 1 is shown in FIG. 3, where components corresponding to those of FIG. 1 are identified by the same reference numerals. The FIG. 3 circuit typically operates with a duty cycle other than fifty percent and requires no capacitance 25. This circuit produces a unsymmetrical voltage waveform across the load. Hence this circuit is not well suited for continuous operation, but is satisfactory for emergency lighting applications. The circuit of FIG. 1 is suitable for both continuous operation and for emergency lighting. Dimming of lamp output for the circuit of FIG. 3 can be obtained by changing the duty cycle or by changing the dc supply voltage or by changing both. This circuit is adapted to a wide range of dc supply voltages by variation of the switching duty cycle. The circuit of FIG. 3 is adaptable to operation with a very low voltage input power source thus making it attractive as an emergency lighting system operated from batteries.

Figures 4, 5:
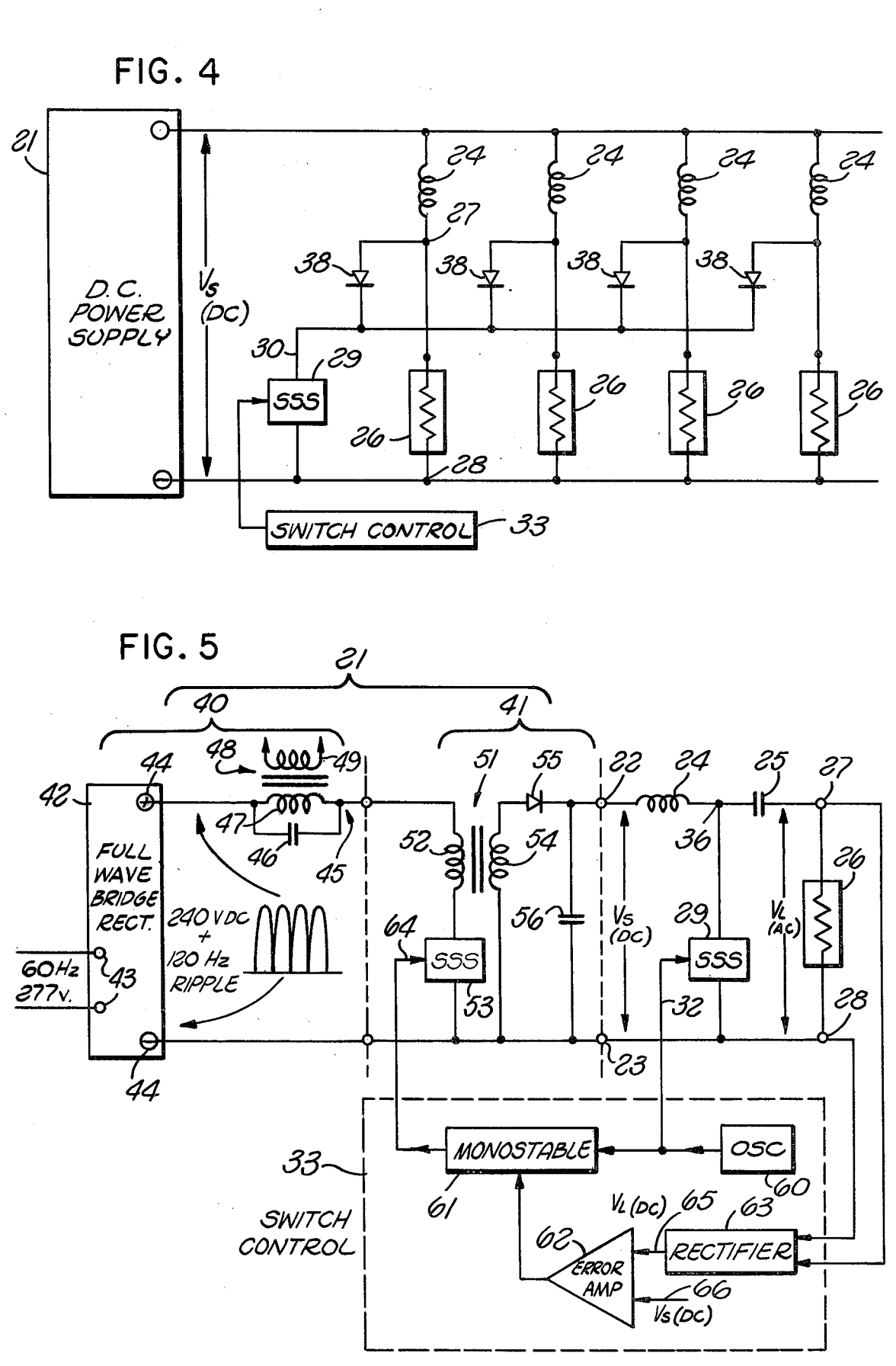

As with the circuit of FIG. 1, the circuit of FIG. 3 may be used to power several loads, and a suitable circuit is shown in FIG. 4, where components corresponding to those of the earlier figures are identified by the same reference numerals. The diode 38 is connected between the load terminal 27 and the terminal 30 of the switch 29, with the switch 29 providing control of power to all four loads. In the circuit of FIG. 4 and the circuit of FIG. 2, each load receives an independent high voltage starting pulse from the switch.

The voltage required to operate a lamp varies with the life of the lamp. For example, a 400 watt high pressure sodium tube when new requires 100 volts across the tube at 4.0 amperes. As the lamp ages the operating voltage rises, typically to 160 volts. Therefore the dc supply must be capable of providing the higher output voltage and also there must be some form of control on the output of the dc supply to provide the lower initial voltage. If the magnitude of the inductance and the power consumption are to be held constant (a desirable requirement), then the load voltage and dc supply voltage increase as the lamp ages. It is preferred to permit the current change between the maximum at the end of the build-up or "switch-closed" half-cycle and the minimum at the end of the decay or "switch-open" half-cycle to change. The diagram of FIG. 5 shows a circuit with a dc supply 21 and switch control unit 33 which will provide a desired mode of operation. Components corresponding to those of FIG. 1 are identified by the same reference numerals. The dc supply 21 includes a unity power factor rectifier and ripple filter 40, and a switching regulator and switching down-converter 41. The unit 40 includes a full-wave bridge rectifier 42 with ac input terminals 43 and rectified dc output terminals 44, and a ripple filter 45 comprising a capacitor 46 connected across an inductance 47. The inductance 47 may be the primary winding of a transformer 48 with a secondary winding 49 which can provide low voltage at low power for the components of the switch control unit 33.

The unit 41 includes another transformer 51 with primary winding 52 and another switch 53 connected across the output from the unit 40. A secondary winding 54 of the transformer 51 is connected through a diode rectifier 55 to the supply terminals 22, 23 with a filter capacitor 56 connected across these terminals.

The switch control unit 33 includes an oscillator 60, and another oscillator 61 operated as a monostable multivibrator, an error amplifier 62, and a rectifier 63. The oscillators 60, 61 may be an IC555. The oscillator 60 is a fixed frequency oscillator, typically operating at 20,000 hertz and provides a pulse train typically at a fifty percent duty cycle, to the control terminal 32 of switch 29. The oscillator 60 also provides a trigger input to the monostable multivibrator 61, and the output of the multivibrator provides a control voltage to the control terminal 64 of the switch 53. The error amplifier 62 has an input terminal 65 with a signal thereon representing the load voltage, which typically may be obtained by connecting the load terminals 27, 28 as inputs to the rectifier 63 to convert the ac voltage across the load to a dc voltage at the amplifier input 65. The error amplifier also has an input terminal 66 with a signal thereon corresponding to the supply voltage at the terminals 22, 23. The output of the error amplifier is the difference of the signals at the two inputs, and this output is connected to the monostable multivibrator 61. The input to the multivibrator from the oscillator 60 controls the frequency of the output to control terminal 64, and the input from the error amplifier 62 controls the duty cycle. With this configuration, the duty cycle of the switch 53 is changed in order to maintain the supply voltage at terminals 22, 23 substantially equal to the load voltage at terminals 27, 28.

Typically a 277 volt 60 hertz supply is connected to the input terminals 43 of the rectifier 42. The filter 45 desirably is a low Q parallel resonant filter which suppresses a large portion of the ripple at the rectifier output terminals 44. The output from the unit 40 which serves as the input to the unit 41 is approximately 250 volts. By varying the duty cycle of the switch 53, the output of the down-converting regulator 41 is able to maintain the dc voltage at terminals 22, 23 at the desired 100 volts while delivering 4.0 amperes at the terminals 22, 23. The voltage at the terminals 22, 23 can be increased to 160 volts by appropriately changing the duty cycle of the switch 53, which occurs as the lamp 26 ages. The full-wave bridge rectifier 42 and the ripple filter 45 provide a substantially unity power factor to the 60 hertz power supply line. The transformer 51 typically is a ferrite core transformer operating at the high frequency of the oscillator 60, while the transformer 48 typically is a low frequency transformer, operating at the 120 hertz ripple frequency.

Figure 6:
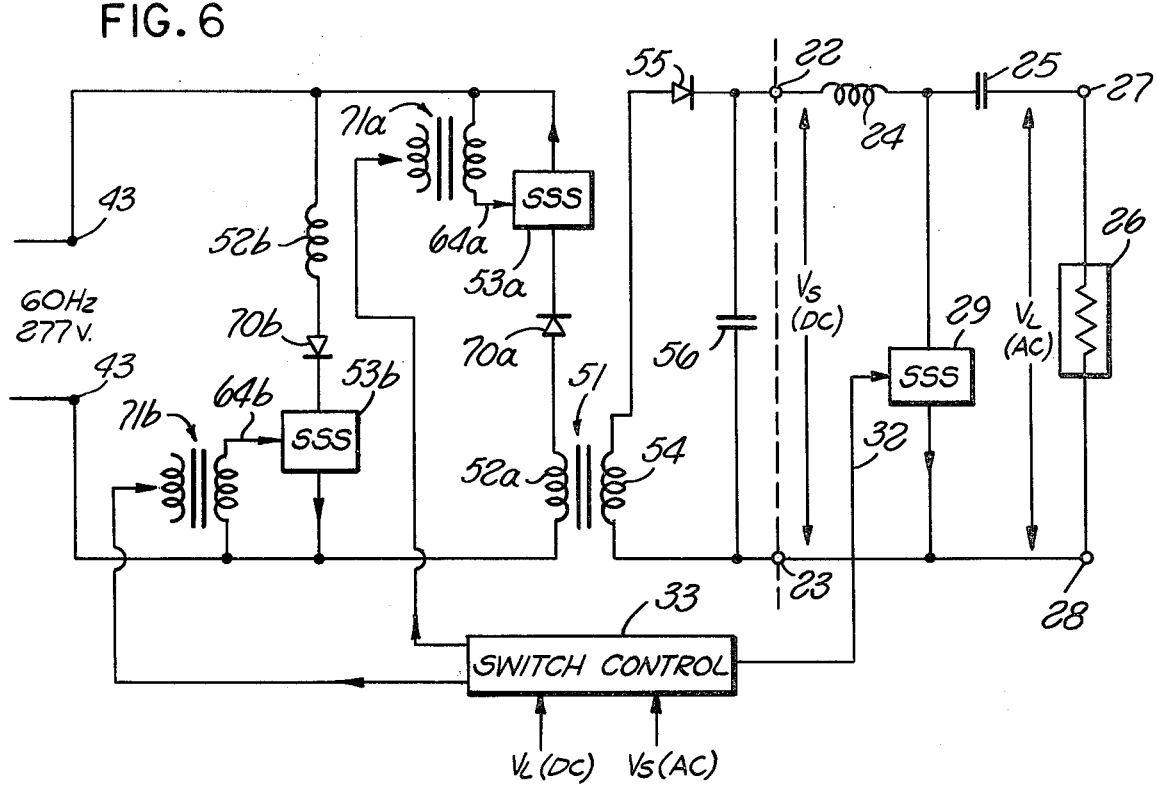
FIG. 6 is an electrical diagram illustrating an alternative embodiment of the circuit of FIG. 5 omitting the conventional 60 hertz full wave rectifier.

An alternative embodiment of the circuit of FIG. 5 is shown in FIG. 6. The circuit of FIG. 6 presents a substantially unity power factor load to the 60 hertz line. In the circuit of FIG. 6, the rectifier 42 and the ripple filter 45 are omitted, reducing the cost of the overall circuit. Components in the circuit of FIG. 6 corresponding to those of FIG. 5 are identified by the same reference numerals. The transformer 51 has two primary windings 52a and 52b, with the winding 52a connected in series with a blocking diode 70a and a switch 53a across the ac terminals 43, and with the winding 52b connected in series with a blocking diode 70b and a switch 53b across the terminals 43. The diodes 70a and 70b are polarized to conduct on alternative half-cycles of the ac supply.

The switch control unit 33 provides the fifty percent duty cycle pulses to the control terminal 32 of the switch 29. The switch control unit 33 provides the variable duty cycle pulses to the control terminal 64a of the switch 53a, preferably through a decoupling transformer 71a, and voltage pulses to the control terminal 64b of the switch 53b via another decoupling transformer 71b. The outputs to the two switches 53a, 53b from the switch control unit 53 are at the same frequency and same duty cycle but of opposite polarity so that the primary windings 52a and 52b are conducting on alternate half-cycles of the 60 hertz line frequency. The transformers 71a, 71b, typically small ferrite transformers, provide complete conductive isolation between the ac line and the supply terminals 22, 23, the load 25 and the switch control unit 33. The operation of the control circuit of FIG. 6 is the same as that of FIG. 5, with the duty cycle being changed as a function of the difference in signals at the error amplifier input to maintain the supply voltage $V_s$ substantially equal to the load voltage $V_L$ as the voltage across the load changes with age.

Figure 7:
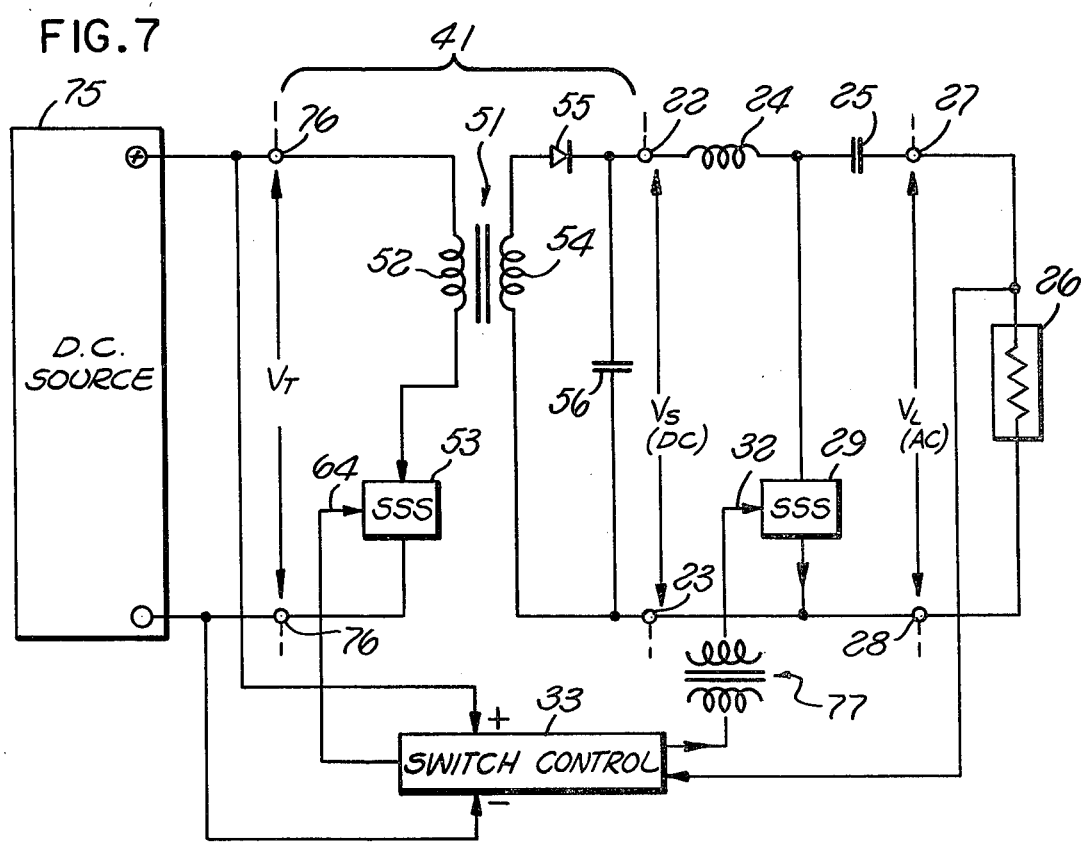
FIG. 7 is an electrical diagram of an alternative embodiment to the circuit of FIG. 5 omitting the 120 hertz ripple filter.

Another alternative embodiment of the circuit of FIG. 5 is shown in the circuit of FIG. 7, where components corresponding to those of FIG. 5 are identified by the same reference numerals. In the circuit of FIG. 7, as in the circuit of FIG. 6, the load circuit is conductively isolated from the variable duty cycle switching circuit so that high voltage pulses developed at the secondary side of the transformer 51 need not affect the variable duty cycle switching circuit directly. The circuit of FIG. 7 can be used with either step-down or step-up voltage converters. One significant application of the circuit of FIG. 7 as a voltage step-up device is its use in emergency lighting where the power supply is low voltage battery.

In the circuit of FIG. 7, a dc source 75 provides a dc voltage at the input terminals 76 of the unit 41. The source 75 may be the rectifier 42 and filter 45 of FIG. 5, or may be a battery, or otherwise as desired. In this embodiment, the voltage $V_T$ at the terminal 76 is used in place of the voltage $V_s$ as one input to the switch control unit 33. The output from the switch control unit 33 to the control terminal 32 of the switch 29 is connected through a transformer 76, typically a small ferrite transformer. The circuit of FIG. 7 provides the isolation of the circuit of FIG. 6 but requires only one primary winding and variable duty cycle switch, making it a less expensive circuit.

Figure 8:
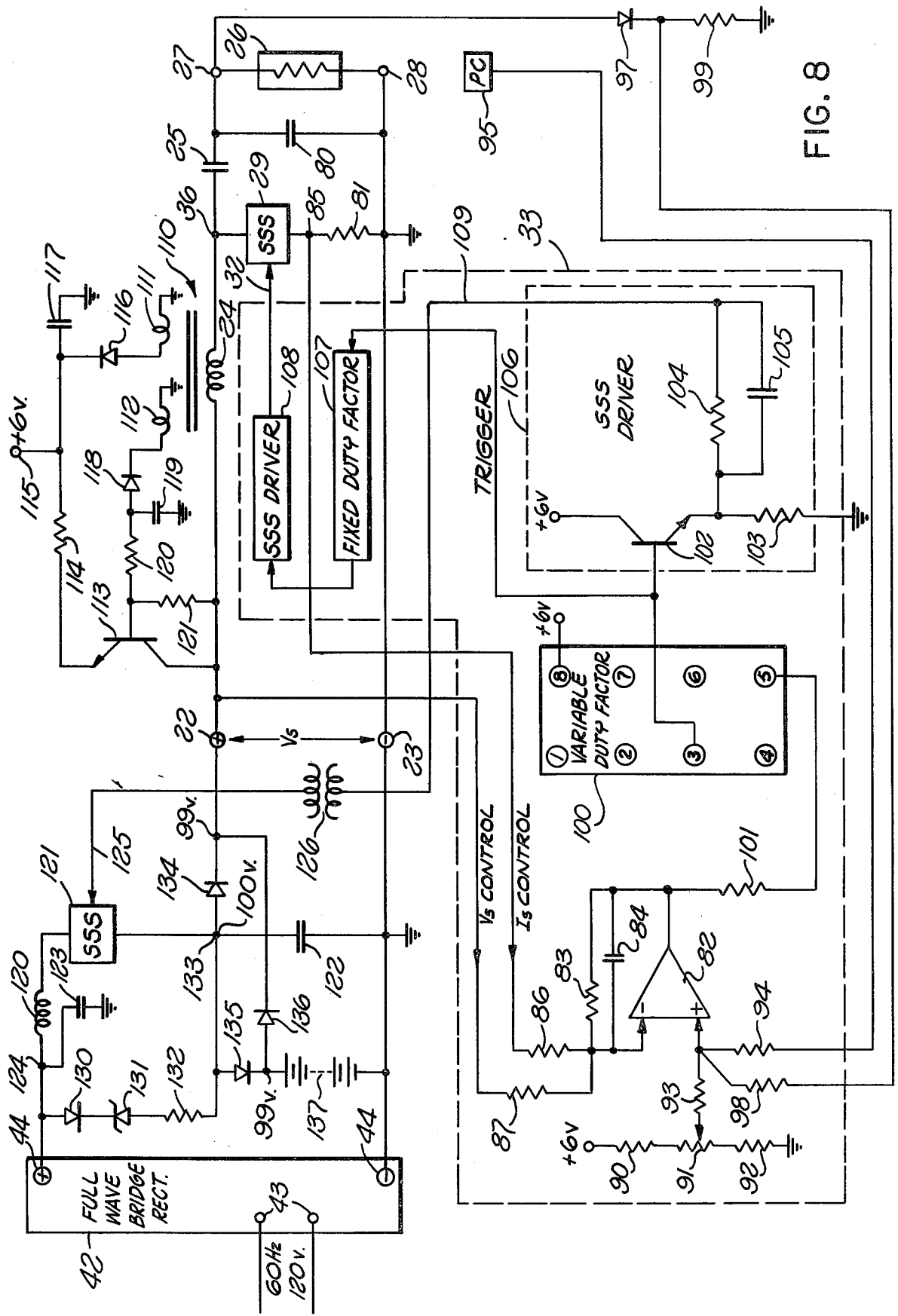
FIG. 8 is an electrical diagram of an electronic ballast circuit incorporating the presently preferred embodiment of the invention.

The diagram of FIG. 8 illustrates the most preferred embodiment of the electronic ballast circuit with components corresponding to those of FIG. 1 identified by the same reference numerals. Another capacitance 80 is connected across the load terminals 27, 28 for limiting the peak voltage before starting. A low value (shunt) resistance 81 is connected in series with the switch 29 to provide a measure for the current from the supply terminal 22.

In the switch control unit 33, an amplifier 82 is operated as an operational amplifier, with a feedback resistance 83 connected between the amplifier output and the feedback input. Another capacitance 84 is connected in parallel with the resistance 83 to serve as an integrator. The junction 85 between the switch 29 and the resistance 81 is connected to the feedback input of the amplifier 82 through a resistance 86. The supply terminal 22 is connected to the feedback input of the amplifier 82 through another resistance 87. A resistance 90, a potentiometer 91, and another resistance 92 are connected in series between a reference voltage source and circuit ground, with the arm of the potentiometer 91 connected to the other input of the amplifier 82 through a resistance 93, to provide an adjustable bias voltage for the amplifier.

A signal representing the intensity of the light output of the lamp 26 may also be connected to the bias input of the amplifier 82, and in the embodiment illustrated, a photocell 95 is positioned adjacent the lamp, with the photocell output connected to the amplifier input through a resistance 96. This results in regulation of the light output.

Compensation for aging of the lamp 26 to maintain substantially constant light output may be obtained by increasing the value of $V_s$. This is achieved by rectification of the positive half-cycles of the voltage across the lamp and using the resultant signal as an input to the amplifier 82. Diode 97 is connected to load terminal 27, with the rectified voltage connected to the bias input of the amplifier 82 through a resistor 98 and to circuit ground through another resistor 99.

An integrated circuit 100, typically an IC555, functions as an oscillator and multivibrator with variable duty cycle or variable duty factor. The output of the amplifier 82 is connected as an input to terminal 5 of the integrated circuit 100 through a resistance 101. The output from the integrated circuit 100 at terminal 3 is connected to a solid state switch driver 106, more specifically to the base of a transistor 102, which transistor provides drive current for the transistor switch 121. The collector and emitter of transistor 102 and a resistance 103 are connected between the positive voltage supply and circuit ground, with the emitter connected through a resistance 104 and capacitance 105 to an output line 109.

The output from the integrated circuit 100 at terminal 3 is also connected as the trigger input to another integrated circuit 107, which may also be an IC555, this time operated at a fixed duty factor of fifty percent on and fifty fifty percent off. The fixed duty factor oscillator output is connected as an input to another solid state switch driver 108, with the driver output connected to the control terminal of the switch 29. The driver 108 may be the same as the driver 106.

A low voltage dc supply for the switch control unit may be included, using the inductance 24 as the primary winding of a step-down transformer 110 with secondary windings 111 and 112. A starting low voltage supply includes transistor 113 and resistor 114 providing approximately 6 volts dc at terminal 115. An operating low voltage supply includes the winding 111, a diode 116 and a capacitance 117. An operating hold-off circuit includes the winding 112, another diode 118, another capacitance 119, and resistances 120, 121.

During starting, power is supplied for the switch control unit through the transistor 113. After the switch 29 is in operation, power is also supplied through the winding 111 and diode 116. Then it is desirable to prevent conduction by the transistor 113, and this is accomplished by applying an appropriate voltage to the gate of the transistor via the winding 112 and associated components.

A preferred form of 60 hertz unity power factor load-loading power supply for providing the voltage $V_s$ at terminals 22, 23 is also shown in FIG. 8. An inductance 120, a solid state switch 121, and a capacitance 122 are connected in series across the terminals 44 of the rectifier 42. A capacitance 123 is connected between junction 124 and circuit ground. The control electrode 125 of the switch 121 is connected to the line 109 through an isolating transformer 126. A diode 130, a zener diode 131, and a resistance 132 are connected between the positive terminal 144 and the junction 133. A diode 134 is connected between the junction 133 and the terminal 22. Diodes 135 and 136 are connected in series between the junction 133 and the terminal 22, with a battery 137 connected between the junction of the diodes 135, 136 and the negative terminals 44, 23.

The circuit 130, 131, 132 provides a bypass around the switch 121 in order to produce a voltage across the capacitance 122 during starting. Capacitance 122 is a large capacitance, typically 1000 to 5000 microfarads and functions as a storage or smoothing capacitance to provide the desired voltage at the junction 133 for the terminal 22. Inductance 120 is a small inductance, typically 1 millihenry, and serves to permit periodic saturation of the solid state switch 121. Capacitance 123 provides for ripple filtering of high frequency current pulses from the 60 hertz line. The diodes 134, 135 and 136 are directional diodes.

During operation, the circuit provides the desired dc power at the terminals 22, 23. This circuit also provides a floating charge for the battery 137. With the appropriate selection of values and the directional diodes, the battery does not discharge into the load except when the ac supply fails. As indicated in FIG. 8, the nominal voltage at junction 133 is 100 volts and the nominal voltage at the positive terminal of the battery and the positive terminal 22 is 99 volts. With this configuration, the battery is always in the circuit but is not being discharged under normal operation. This provides an uninterrupted power supply for the load even for a single cycle of interruption of the ac supply. Also, and most importantly, the circuit provides a unity power factor load on the ac line. If the uninterrupted characteristic is not needed, the battery and associated diodes may be omitted and the unity power factor characteristic is still obtained. In an alternative configuration, the battery may be utilized as the smoothing capacitance, omitting the capacitance 122 and the directional diodes. with this latter configuration, the battery will be charged and discharged at the switching frequency resulting in shorter battery life.

The circuit of FIG. 8 provides for operation of the lamp with a fixed symmetrical duty factor while providing available duty factor to control the powr to the lamp. This avoids operating the lamp with an unsymmetrical waveform and achieves the same amount of electrode stressing on each end of the lamp. The ratio of values of the resistors 86, 87 may be selected to give the desired fraction of regulatory control to $I_s$ and $V_s$, respectively. In an alternative embodiment, the oscillator 107 and driver 108 may be omitted, with the control electrode 32 of switch 29 connected to line 109 for operating the switch 29 from the driver 106. Other simplifications may include omission of the photocell 85 and/or the diode 97.

Typical values and components for the circuit of FIG. 8 are set out in Table 1.

TABLE 1

| | | | |
|---|---|---|---|
| Load 26 - 70 watt high pressure sodium lamp | | Resistance 81 | 0.1 ohms |
| Switch 29 - (RCA) BU208 (or equivalent) | | Resistance 83 | 50 kohms |
| Transistor 102 - MJE 3055T | | Resistance 86 | 100 ohms |
| IC100 - IC555 | | Resistance 87 | 62 kohms |
| Inductance 24 - 10 millihenries | | Resistance 90 | 6.8 ohms |
| Capacitance 25 - 1.0 µf | | Resistance 91 | 500 ohms |
| Capacitance 80 - 1000–5000 pf | | | |
| Capacitance 84 - 0.2 µf | | Resistance 92 | 200 ohms |
| Capacitance 105 - 5.0 µf | | Resistance 93 | 10 kohms |
| dc voltage $V_s$ - 50–70 volts dc | | Resistance 94 | 10 kohms |
| | | Resistance 98 | 10 kohms |
| | | Resistance 99 | 10 kohms |
| Switching frequency - 15–20 KHz | | Resistance 101 | 1.5 kohms |
| Amplifier 82 - LM 324 (one of 4 op. amps. in same IC) | | Resistance 102 | 10 ohms |
| Diode 97 | | Resistance 104 | 10 ohms |

In operation, the average current through low resistance (shunt) 81 is equal to $I_s$ plus $I_{load}$. It is the current drawn from the dc power supply $V_s$. The average current flowing through resistance 86 into the amplifier feedback input or node is, therefore, partly proportional to $I_s$. Similarly the average current flowing through resistance 87 into the feedback node is proportional to $V_s$, the supply voltage average.

$I_s$ will depend on the resistance of the tube 26, which is very low during early warm up, and approximately 42 ohms operating when new and substantially higher yet as the tube ages (typical life is 24,000 hours). Thus a typical $I_s$ is 1.3 amperes. $V_s$ is typically 60 volts, and may be as high as 70 volts and as low as 50 volts.

The time constant of the integrator, formed by the high-gain operational amplifier 82 and the negative feedback capacitance 84, is such that several pulse samples at a rate of 15,000 to 20,000 hertz are averaged.

The bias from potentiometer 91 is adjusted so that, for the mid-range (i.e., normal operating values) of $V_s$ and $I_s$, the output voltage of the amplifier is set to give the desired duty factor on the output 3 of the integrated circuit 100. Typically this might be +3 volts for a duty factor of thirty percent or +4 volts (approx.) for fifty percent.

As $V_s$ changes, $I_s$ will change in complementary fashion, i.e., to hold the product of $I_s \times V_s$ nearly constant. This constant product (constant power) stabilization holds over a range of ±15% in $V_s$.

During early warm up of the tube 26, the load resistance is very low (e.g., 10 ohms approx.) and $I_s$ in the absence of stabilization would climb to very high values, higher than the switch 29 can tolerate. However, increase in $I_s$ by a very small amount causes a large decrease in duty factor (which decreases $I_s$), hence stabilization is attained. As the tube 26 ages its resistance increases. Without $I_s$ stabilization, $I_s$ would decrease, power from $V_s$ would decrease and light output would decrease. With the $I_s/V_s$ control, the power from $V_s$ is held constant in the face of age-caused change in load resistance, power to the HPS lamp is stabilized and light output is stabilized.

The transistor 102 provides sufficient current drive into the base of the transistor switch 29 to cause collector-emitter voltage to be a minimum during conduction (saturation). Also the capacitance 105 provides high frequency emphasis to the switch 29 to minimize rise and fall times of the transistor switch.

The capacitance 80 is a small capacitance which limits the maximum starting voltage to which the collector of switch 29 is allowed to rise, as when the lamp is not in the socket or when there is an open circuit or when the device is put into operation.

The circuit of FIG. 8 provides for control of input source current and power and output light using variable duty cycle, and allows power from the dc supply to be held nearly constant even though the voltage level of the dc supply changes.

The dc supply voltage level may change at a 120 hertz rate as, for example, does the output of a 60 hertz full-wave rectifier with very small ripple filter capacitor. By appropriate choice of gain around the regulatory loop and of time constants which control the averaging function, this electronic ballast circuit can be made to change duty cycle within the 8.3 ms of each cycle of the 60 hertz full-wave rectifier. Thus the 120 hertz ripple filter capacitor need not be made so large. At high voltage peaks the "on" time will be relatively small and at low voltage regions the "on" time is maximized and thus flicker effects from this cause are minimized.

As a direct result of the circuit's tolerance for substantial 120 hertz ripple without giving rise to excessive flicker effects in light output, the amount of capacitor-input filtering on the output of the 60 hertz rectifier can be vastly reduced so as to result in a very high 60 hertz power factor, e.g., 96% or greater.

In the alternative embodiments of FIGS. 9 and 10, the inductance 24 is omitted, with the primary and secondary windings 54 of the transformer 51 providing the inductance storage capability. In the circuits of FIGS. 9 and 10, components corresponding to those of FIG. 7 are identified by the same reference numerals. The circuit of FIG. 9 utilizes two separate switches 29 and 53, while the circuit of FIG. 10 uses a single switch 53.

The step-up or step-down action of the switched-mode transformer 51 with diode 55 in series with secondary winding 54, is somewhat similar in principle to the conventional flyback transformer power supply. However there is no filter capacitor across the rectified secondary. Instead of charging a filter capacitor, this flyback circuit drives the gas tube load (or any resistive load) and, simultaneously, charges capacitance 25. This happens on the decay part of the switching cycle, with current in the direction shown by arrow D. During the other half of the approximately fifty percent duty switching cycle, the build-up part, the output capacitance 25 is discharged partially in the current direction shown by arrow B. This results in a bipolar waveform current through the load.

Also, during the B part of the switching cycle, the solid state switch 53 in the transformer primary circuit is closed and current from the source 75 builds up in the primary winding 52, thus replenishing the energy stored in the magnetic field of the transformer. Note that during the B phase the polarity of secondary voltage is such that diode 55 does not conduct. Thus the secondary winding does not load the primary winding during build-up of current through the primary.

The circuit of FIG. 10 accomplishes economy of components at the expense of loss of conductive isolation between the primary and secondary portions of the circuit. The operation of the circuits is basically the same as that of FIG. 9.

I claim:

1. In an electronic ballast circuit for operating gaseous discharge lamps, the combination of:
   means defining first and second load terminals;
   a dc power supply having first and second supply terminals;
   an inductance;
   a capacitance;
   circuit means connecting said inductance and capacitance in series at a junction, with said inductance connected to said first supply terminal and with said capacitance connected to said first load terminal and with said second supply terminal connected to said second load terminal;
   a solid state switch having input and output terminals connected between said junction and said second supply and load terminals, and having a control terminal for opening and closing a circuit between said input and output terminals in response to a switching voltage on said control terminal;
   a switch control circuit providing voltage pulses as an output, with said output connected to said control terminal as said switching voltage;
   means defining third and fourth load terminals, with said second and fourth load terminals interconnected;
   a second inductance;
   a second capacitance;
   second circuit means connecting said second inductance and second capacitance in series at a second junction, with said second inductance connected to said first supply terminal and said second capacitance connected to said third load terminal;
   a first diode connected between said first junction and said solid state switch; and
   a second diode connected between said second junction and said solid state switch.

2. In an electronic ballast circuit for operating gaseous discharge lamps, the combination of:
   means defining first and second load terminals;
   a dc power supply having first and second supply terminals;
   an inductance;
   a capacitance;
   circuit means connecting said inductance and capacitance in series at a junction, with said inductance connected to said first supply terminal and with said capacitance connected to said first load terminal and with said second supply terminal connected to said second load terminal;
   a solid state switch having input and output terminals connected between said junction and said second supply and load terminals, and having a control terminal for opening and closing a circuit between said input and output terminals in response to a switching voltage on said control terminal; and
   a switch control circuit providing voltage pulses as an output, with said output connected to said control terminal as said switching voltage;
   said dc power supply including:
   a rectifier having an ac input and a rectified dc output;
   a transformer having primary and secondary windings;
   a first filter;
   a second solid state switch having second input and output terminals, and having a second control terminal for opening and closing a circuit between said second input and output terminals in response to a switching voltage on said second control terminal;
   second circuit means connecting said first filter, primary winding and second switch input and output terminals in series across said rectifier output; and
   a second rectifier and filter connected across said secondary winding to provide said first and second supply terminals;
   with said switch control circuit output connected to said second control terminal.

3. An electronic ballast circuit as defined in claim 2 wherein said switch control circuit includes:
   a first oscillator providing said output to said control terminal;
   a second monostable oscillator having a trigger input and a timing input, with said first oscillator output connected to said trigger input, and providing a second output to said second control terminal;
   an error amplifier having first and second inputs and an output, with said error amplifier output connected to said second oscillator timing input; and
   circuit means connecting a signal representing the voltage across said supply terminals as one input to said error amplifier and connecting a signal representing the voltage across said load terminals as the other input to said error amplifier.

4. In an electronic ballast circuit for operating gaseous discharge lamps, the combination of:
   means defining first and second load terminals;
   a dc power supply having first and second supply terminals;
   an inductance;
   a capacitance;
   circuit means connecting said inductance and capacitance in series at a junction, with said inductance connected to said first supply terminal and with said capacitance connected to said first load terminal and with said second supply terminal connected to said second load terminal;
   a solid state switch having input and output terminals connected between said junction and said second supply and load terminals, and having a control terminal for opening and closing a circuit between said input and output terminals in response to a switching voltage on said control terminal; and
   a switch control circuit providing voltage pulses as an output, with said output connected to said control terminal as said switching voltage;
   said dc power supply including:
   means defining first and second ac supply terminals;
   a transformer having first and secondary primary windings and a secondary winding;
   a second solid state switch having input and output terminals connected in series with a first diode across said ac supply terminals, and having a control terminal for opening and closing a circuit between said input and output terminals in response to a switching voltage on said control terminal,
   a third solid state switch having input and output terminals connected in series with a second diode across said ac supply terminals, and having a control terminal for opening and closing a circuit between said input and output terminals in response to a switching voltage on said control terminal; and
   a rectifier and filter connected across said secondary winding to provide said first and second supply terminals;

with said switch control circuit providing voltage pulses to said control terminals of each said switches.

5. An electronic ballast circuit as defined in claim 4 wherein said switch control circuit includes:
a first oscillator providing said output to said control terminal;
a second monostable oscillator having a trigger input and a timing input, with said first oscillator output connected to said trigger input, and providing a second output to said second control terminal and a third output to said third control terminal;
an error amplifier having first and second inputs and an output, with said error amplifier output connected to said second oscillator timing input; and
circuit means connecting a signal representing the voltage across said supply terminals as one input to said error amplifier and connecting a signal representing the voltage across said load terminals as the other input to said error amplifier.

6. In an electronic ballast circuit for operating gaseous discharge lamps, the combination of:
means defining first and second load terminals;
a dc power supply having first and second supply terminals;
an inductance;
a capacitance;
circuit means connecting said inductance and capacitance in series at a junction, with said inductance connected to said first supply terminal and with said capacitance connected to said first load terminal and with said second supply terminal connected to said second load terminal;
a solid state switch having input and output terminals connected between said junction and said second supply and load terminals, and having a control terminal for opening and closing a circuit between said input and output terminals in response to a switching voltage on said control terminal; and
a switch control circuit providing voltage pulses as an output, with said output connected to said control terminal as said switching voltage;
said dc power supply including:
a dc source;
a transformer having primary and secondary windings;
a second solid state switch having second input and output terminals connected in series with said primary winding across said dc source, and having a second control terminal for opening and closing a circuit between said second input and output terminals in response to a switching voltage on said second control terminal; and
a regulator and filter connected across said secondary winding to provide said first and second supply terminals;
with said switch control circuit output connected to said second control terminal.

7. An electronic ballast circuit as defined in claim 6 wherein said switch control circuit includes:
a first oscillator providing said output to said control terminal;
a second monostable oscillator having a trigger input and a timing input, with said first oscillator output connected to said trigger input, and providing a second output to said second control terminal;
an error amplifier having first and second inputs and an output, with said error amplifier output connected to said second oscillator timing input; and
circuit means connecting a signal representing the voltage at said dc source as one input to said error amplifier and a signal representing the voltage across said load terminal as the other input to said error amplifier.

8. In an electronic ballast circuit for operating gaseous discharge lamps, the combination of:
means defining first and second load terminals;
a dc power supply having first and second supply terminals;
an inductance;
a capacitance;
circuit means connecting said inductance and capacitance in series at a junction, with said inductance connected to said first supply terminal and with said capacitance connected to said first load terminal and with said second supply terminal connected to said second load terminal;
a solid state switch having input and output terminals connected between said junction and said second supply and load terminals, and having a control terminal for opening and closing a circuit between said input and output terminals in response to a switching voltage on said control terminal; and
a switch control circuit providing voltage pulses as an output, with said output connected to said control terminal as said switching voltage;
said dc power supply including:
an oscillator providing said output to said control terminal, said oscillator having an input terminal with a signal at said input terminal varying the duty cycle of the output of said oscillator;
an operational amplifier having a feedback input, a bias input and an output, with said operational amplifier output connected to aid oscillator input terminal for duty cycle control;
an integrating circuit connected between said operational amplifier output and feedback input; and
circuit means for connecting a signal representing the voltage at said supply terminals to said feedback input and for connecting a signal representing the current from said supply terminals to said feedback input.

9. An electronic ballast circuit as defined in claim 8 wherein said dc power supply includes:
a rectifier having an ac input and a rectified dc output;
a filter circuit;
a second solid state switch having second input and output terminals, and having a second control terminal for opening and closing a circuit between said second input and output terminals in response to a switching voltage on said second control terminal;
charge storage means;
second circuit means connecting said filter circuit, second switch input and output terminals, and charge storage means in series across said rectifier output; and
a second rectifier and resistance connected across said filter circuit and second switch;
with said switch control circuit output connected to said second control terminal.

10. An electronic ballast circuit as defined in claim 8 wherein said dc power supply includes:

a rectifier having an ac input and a rectified dc output;

a filter circuit;

a second solid state switch having second input and output terminals, and having a second control terminal for opening and closing a circuit between said second input and output terminals in response to a switching voltage on said second control terminal;

a storage capacitance;

second circuit means connecting said filter circuit, second switch input and output terminals, and storage capacitance in series across said rectifier output;

a battery;

directional diode means connecting said battery in parallel with said storage capacitance; and a second rectifier and resistance connected across said filter circuit and second switch;

with said switch control circuit output connected to said second control terminal.

11. An electronic ballast circuit as defined in claim 8 wherein said means for connecting a signal representing the current includes a first resistance in series with said solid state switch input and output terminals, and a second resistance connected between the junction of said first resistance and solid state switch and said feedback input.

12. An electronic ballast circuit as defined in claim 8 including means for developing an intensity signal representing the light output of a lamp connected across said load terminals, and means for connecting said intensity signal to said bias input.

13. An electronic ballast circuit as defined in claim 8 including a second capacitance connected across said load terminals.

14. In an electronic ballast circuit for operating gaseous discharge lamps, the combination of:

means defining first and second load terminals;

a dc power supply having first and second supply terminals;

a transformer having a primary winding and a secondary winding;

a capacitance;

a first diode rectifier;

first circuit means connecting said first diode rectifier and said capacitance in series at a junction, with said first diode rectifier connected to one terminal of said secondary winding and said capacitance connected to said first load terminal with the other terminal of said secondary winding connected to said second load terminal;

switch means connected between said junction and said second load terminal and between one terminal of said primary winding and said second supply terminal, and having control means for opening and closing said switch means in response to a switching voltage;

second circuit means connecting the other terminal of said primary winding to said first supply terminal; and a switch control circuit providing voltage pulses as an output to said control means as said switching voltage.

15. An electronic ballast circuit as defined in claim 14 wherein said switch control circuit includes:

a first oscillator providing a first output;

a second monostable oscillator having a trigger input and a timing input, with said first oscillator output connected to said trigger input, and providing a second output to said control means of said switch means;

an error amplifier having first and second inputs and an output, with said error amplifier output connected to said second oscillator timing input; and circuit means connecting a signal representing the voltage across said supply terminals as one input of said error amplifier and a signal representing the voltage across said load terminals as the other input to said error amplifier.

16. An electronic ballast circuit as defined in claim 14 wherein said second circuit means includes a second diode rectifier.

17. An electronic ballast circuit as defined in claim 14 wherein said switch means includes a first switch connected between said junction and second load terminal, and a second switch connected between said primary winding and said second supply terminal, with said first switch having a first control terminal and said second switch having a second control terminal.

18. An electronic ballast circuit as defined in claim 17 wherein said switch control circuit includes:

a first oscillator providing said output to said first control terminal;

a second monostable oscillator having a trigger input and a timing input, with said first oscillator output connected to said trigger input, and providing a second output to said second control terminal;

an error amplifier having first and second inputs and an output, with said error amplifier output connected to said second oscillator timing input; and circuit means connecting a signal representing the voltage across said supply terminals as one input to said error amplifier and a signal representing the voltage across said load terminals as the other input to said error amplifier.

19. In an electronic ballast circuit for operating gaseous discharge lamps, the combination of:

means defining first and second load terminals;

a dc power supply having first and second supply terminals;

an inductance;

circuit means connecting said inductance between said first supply and load terminals and connecting said second supply terminal to said second load terminal;

a solid state switch having input and output terminals connected across said first and second load terminals, and having a control terminal for opening and closing a circuit between said input and output terminals in response to a switching voltage on said control terminal;

a switch control circuit providing voltage pulses as an output, with said output connected to said control terminal as said switching voltage;

means defining third and fourth load terminals with said second and fourth load terminals interconnected;

a second inductance;

second circuit means connecting said second inductance between said first supply terminal and said third load terminal;

a first diode connected between said first load terminal and said solid state switch; and a second diode connected between said third load terminal and said solid state switch.

20. In an electronic ballast circuit for operating gaseous discharge lamps, the combination of:
means defining first and second load terminals;
a dc power supply having first and second supply terminals;
an inductance;
a capacitance;
circuit means connecting said inductance and capacitance in series at a junction, with said inductance connected to said first supply terminal and said capacitance connected to said first load terminal and with said second supply terminal connected to said second load terminal;
a solid state switch having input and output terminals connected between said junction and said second supply and load terminals, and having a control terminal for opening and closing a circuit between said input and output terminals in response to a switching voltage on said control terminal;
an oscillator providing said output to said control terminal as said switching voltage, said oscillator having an input terminal with a signal at said input terminal varying the duty cycle of the output of said oscillator;
an operational amplifier having a feedback input, a bias input and an output, with said operational amplifier output connected to said oscillator input terminal for duty cycle control;
an integrating circuit connected between said operational amplifier output and feedback input; and
circuit means for connecting a signal representing the voltage at said supply terminals to said feedback input and for connecting a signal representing the current from said supply terminals to said feedback input.

21. An electronic ballast circuit as defined in claim 20 wherein said means for connecting a signal representing the current includes a first resistance in series with said solid state switch input and output terminals, and a second resistance connected between the junction of said first resistance and solid state switch and said feedback input; and including
means for developing an intensity signal representing the light output of a lamp connected across said load terminals;
means for connecting said intensity signal to said bias input; and
a second capacitance connected across said load terminals.

22. In an electronic ballast circuit for operating gaseous discharge lamps, the combination of:
means defining first and second load terminals;
a dc power supply having first and second supply terminals;
an inductance;
a capacitance;
circuit means connecting said inductance and capacitance in series at a junction, with said inductance connected to said first supply terminal and with said capacitance connected to said first load terminal and with said second supply terminal connected to said second load terminal;
a solid state switch having input and output terminals connected between said junction and said second supply and load terminals, and having a control terminal for opening and closing a circuit between said input and output terminals in response to a switching voltage on said control terminal; and
a switch control circuit providing voltage pulses as an output, with said output connected to said control terminal as said switching voltage;
said dc power supply including:
a rectifier having an ac input and a rectified dc output;
a filter circuit;
a second solid state switch having second input and output terminals, and having a second control terminal for opening and closing a circuit between said second input and output terminals in response to a switching voltage on said second control terminal;
charge storage means;
second circuit means connecting said filter circuit, second switch input and output terminals, and charge storage means in series across said rectifier output; and
a second rectifier and resistance connected across said filter circuit and second switch;
with said switch control circuit output connected to said second control terminal.

23. An electronic ballast circuit as defined in claim 22 wherein said charge storage means is a capacitance.

24. An electronic ballast circuit as defined in claim 22 wherein said charge storage means is a battery.

25. In an electronic ballast circuit for operating gaseous discharge lamps, the combination of:
means defining first and second load terminals;
a dc power supply having first and second supply terminals;
an inductance;
a capacitance;
circuit means connecting said inductance and capacitance in series at a junction, with said inductance connected to said first supply terminal and with said capacitance connected to said first load terminal and with said second supply terminal connected to said second load terminal;
a solid state switch having input and output terminals connected between said junction and said second supply and load terminals, and having a control terminal for opening and closing a circuit between said input and output terminals in response to a switching voltage on said control terminal; and
a switch control circuit providing voltage pulses as an output, with said output connected to said control terminal as said switching voltage;
said dc power supply including:
a rectifier having an ac input and a rectified dc output;
a filter circuit;
a second solid state switch having second input and output terminals, and having a second control terminal for opening and closing a circuit between said second input and output terminals in response to a switching voltage on said second control terminal;
a storage capacitance;
second circuit means connecting said filter circuit, second switch input and output terminals, and storage capacitance in series across said rectifier output;
a battery;
directional diode means connecting said battery in parallel with said storage capacitance; and a second rectifier and resistance connected across said filter circuit and second switch;
with said switch control circuit output connected to said second control terminal.

26. In an electronic ballast circuit for operating gaseous discharge lamps, the combination of:
means defining first and second load terminals;
a dc power supply having first and second supply terminals;
an inductance;
a capacitance;
circuit means connecting said inductance and capacitance in series at a junction, with said inductance connected to said first supply terminal and with said capacitance connected to said first load terminal and with said second supply terminal connected to said second load terminal;
a solid state switch having input and output terminals connected between said junction and said second supply and load terminals, and having a control terminal for opening and closing a circuit between said input and output terminals in response to a switching voltage on said control terminal; and
a switch control circuit providing voltage pulses as an output, with said output connected to said control terminal as said switching voltage;
said dc power supply including:
a rectifier having an ac input and a rectified dc output;
a filter circuit;
a second solid state switch having second input and output terminals, and having a second control terminal for opening and closing a circuit between said second input and output terminals in response to a switching voltage on said second control terminal;
charge storage means;
second circuit means connecting said filter circuit, second switch input and output terminals, and charge storage means in series across said rectifier output; and
a second rectifier and resistance connected across said filter circuit and second switch;
and wherein said switch control circuit includes:
a first solid state switch having first output terminals connected between said junction and said second supply and load terminals, and having a first control terminal for opening and closing a circuit between said first input and output terminals in response to a first switching voltage on said first control terminal;
a first oscillator providing an output to said first control terminal as said first switching voltage, said first oscillator having an input terminal with a signal at said input terminal triggering the output of said first oscillator and with said first oscillator having a balanced duty cycle providing a symmetrical output;
a second oscillator providing an output to said second control terminal as said second switching voltage, said second oscillator having an input terminal with a signal at said input terminal varying the duty cycle of the output of said second oscillator;
an operational amplifier having a feedback input, a bias input and an output, with said operational amplifier output connected to said second oscillator input terminal for duty cycle control and with said second oscillator providing a trigger input for said first oscillator;
an integrating circuit connected between said operational amplifier output and feedback input; and
circuit means for connecting a signal representing the voltage at said supply terminals to said feedback input and for connecting a signal representing the current from said supply terminals to said feedback input.

27. In an electronic ballast circuit for operating gaseous discharge lamps, the combination of:
means defining first and second load terminals;
a dc power supply having first and second supply terminals;
an inductance;
a capacitance;
circuit means connecting said inductance and capacitance in series at a junction, with said inductance connected to said first supply terminal and said capacitance connected to said first load terminal and with said second supply terminal connected to said second load terminal;
a first solid state switch having first input and output terminals connected between said junction and said second supply and load terminals, and having a first control terminal for opening and closing a circuit between said first input and output terminals in response to a first switching voltage on said first control terminal;
a first oscillator providing an output to said first control terminal as said first switching voltage, said first oscillator having an input terminal with a signal at said input terminal triggering the output of said first oscillator and with said first oscillator having a balanced duty cycle providing a symmetrical output;
said dc power supply including
a rectifier having an ac input and a rectified dc output,
a filter circuit,
a second solid state switch having second input and output terminals, and having a second control terminal for opening and closing a circuit between said second input and output terminals in response to a second switching voltage on said second control terminal,
charge storage means,
second circuit means connecting said filter circuit, second switch input and output terminals, and charge storage means in series across said rectifier output, and
a second rectifier and resistance connected across said filter circuit and second switch;
a second oscillator providing an output to said second control terminal as said second switching voltage, said second oscillator having an input terminal with a signal at said input terminal varying the duty cycle of the output of said second oscillator;
an operational amplifier having a feedback input, a bias input and an output, with said operational amplifier output connected to said second oscillator input terminal for duty cycle control and with said second oscillator providing a trigger input for said first oscillator;
an integrating circuit connected between said operational amplifier output and feedback input; and
circuit means for connecting a signal representing the voltage at said supply terminals to said feedback input and for connecting a signal representing the current from said supply terminals to said feedback input.

* * * * *

UNITED STATES PATENT AND TRADEMARK OFFICE
CERTIFICATE OF CORRECTION

PATENT NO. : 4,441,053
DATED : April 3, 1984
INVENTOR(S) : John I. Daspit

It is certified that error appears in the above-identified patent and that said Letters Patent is hereby corrected as shown below:

On the title page:

The title of the invention should read:

--SWITCHED MODE ELECTRONIC BALLAST--

Signed and Sealed this

Eleventh Day of September 1984

[SEAL]

Attest:

GERALD J. MOSSINGHOFF

Attesting Officer   Commissioner of Patents and Trademarks